United States Patent
Li et al.

(10) Patent No.: US 8,408,006 B2
(45) Date of Patent: Apr. 2, 2013

(54) POWER PLANT WITH $CO_2$ CAPTURE

(75) Inventors: Hongtao Li, Aarau (CH); Jurgen Hoffmann, Untersiggenthal (CH); Holger Nagel, Stuttgart (DE); Francois Droux, Oberrohrdorf (CH); Celine Mahieux, Baden (CH); Christoph Ruchti, Uster (CH); Manfred Wirsum, Baden-Dattwil (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/161,325

(22) Filed: Jun. 15, 2011

(65) Prior Publication Data
US 2011/0302922 A1 Dec. 15, 2011

Related U.S. Application Data

(63) Continuation of application No. PCT/EP2009/067630, filed on Dec. 21, 2009.

(30) Foreign Application Priority Data

Dec. 24, 2008 (EP) .................................... 08172886

(51) Int. Cl.
*F02C 3/34* (2006.01)
*F02C 6/18* (2006.01)
*F01K 23/10* (2006.01)
(52) U.S. Cl. ......... 60/772; 60/773; 60/39.52; 60/39.182
(58) Field of Classification Search .................... 60/772, 60/773, 39.182, 39.52, 39.24
See application file for complete search history.

(56) References Cited

U.S. PATENT DOCUMENTS

| 6,202,400 | B1 | 3/2001 | Utamura et al. |
| 6,256,976 | B1 * | 7/2001 | Kataoka et al. ............... 60/39.52 |
| 7,007,487 | B2 * | 3/2006 | Belokon et al. ............... 60/39.52 |
| 7,513,117 | B2 * | 4/2009 | Garay et al. ...................... 60/772 |
| 2006/0272331 | A1 * | 12/2006 | Bucker et al. .................... 60/774 |
| 2007/0034171 | A1 * | 2/2007 | Griffin et al. ............... 122/479.1 |
| 2007/0034704 | A1 * | 2/2007 | Hu et al. ....................... 237/12.1 |
| 2008/0010967 | A1 * | 1/2008 | Griffin et al. ................ 60/39.52 |
| 2008/0060346 | A1 | 3/2008 | Asen et al. |
| 2008/0104938 | A1 | 5/2008 | Finkenrath et al. |

FOREIGN PATENT DOCUMENTS

| DE | 19728151 A1 | 1/1999 |
| DE | 102007050783 A1 | 5/2008 |
| JP | 4191418 A | 7/1992 |
| WO | 0238927 A1 | 5/2002 |
| WO | 2006129150 A2 | 12/2006 |

OTHER PUBLICATIONS

Bolland, O. and Saether, S. "New Concepts for Natural Gas Fired Power Plants Which Simplify the Recovery of Carbon Dioxide" Energy Conyers. Mgmt, vol. 33, No. 5-8, pp. 467-475, 1992.

* cited by examiner

*Primary Examiner* — Ted Kim
(74) *Attorney, Agent, or Firm* — Volpe and Koenig, P.C.

(57) ABSTRACT

A method is provided for operating a combined cycle power plant including a $CO_2$ capture system and flue gas recirculation system. The method includes controlling a flue gas recirculation rate and a re-cooling temperature of the recirculated flue gases, depending on load, to optimize the overall plant efficiency including the $CO_2$ capture system. Also provided is a combined cycle power plant including a $CO_2$ capture system and flue gas recirculation system. The plant being configured to carry out a method in which a flue gas recirculation rate and a re-cooling temperature of recirculated flue gases is controlled depending on load to optimize the overall plant efficiency including the $CO_2$ capture system.

19 Claims, 3 Drawing Sheets

POWER PLANT WITH CO₂ CAPTURE

CROSS REFERENCE TO RELATED APPLICATION

This application is a continuation of International Application No. PCT/EP2009/067630 filed Dec. 21, 2009, which claims priority to European Patent Application No. 08172886.7, filed Dec. 24, 2008, the entire contents of all of which are incorporated by reference as if fully set forth.

FIELD OF INVENTION

The field of invention relates to a method for operating a combined cycle power plant with integrated $CO_2$ capture and flue gas recirculation as well as to a plant to carry out such a method.

BACKGROUND

In recent years it has become obvious that the generation of greenhouse gases leads to global warming and that further increase in greenhouse gas production will accelerate global warming. Since $CO_2$ (carbon dioxide) is identified as a main greenhouse gas, CCS (carbon capture and storage) is considered as one of the potential major means to reduce the release of greenhouse gases into the atmosphere and to control global warming. In this context CCS is defined as the process of $CO_2$ capture, compression, transport and storage. Capture is defined as a process in which $CO_2$ is removed either from the flue gases after combustion of a carbon based fuel or the removal of and processing of carbon before combustion. Regeneration of any absorbents, adsorbents or other means to remove $CO_2$ from a flue gas or fuel gas flow is considered to be part of the capture process.

Backend $CO_2$ capture or post combustion capture is a commercially promising technology for fossil fuelled power plants including CCPP (combined cycle power plants). In post-combustion capture the $CO_2$ is removed from a flue gas. The remaining flue gas is released to the atmosphere and the $CO_2$ is compressed for transportation, and storage. There are several technologies known to remove $CO_2$ from a flue gas such as absorption, adsorption, membrane separation, and cryogenic separation. Power plants with post-combustion capture are the subject of this invention.

All known technologies for $CO_2$ capture require relatively large amounts of energy. Due to the relatively low $CO_2$ concentration of only about 4% in the flue gases of a conventional CCPP, the $CO_2$ capture system (also called $CO_2$ capture plant or $CO_2$ capture equipment) for a conventional CCPP will be more costly and energy consuming per kg of captured $CO_2$ than the ones for other types of fossil power plants, like coal fired plants, which have a relatively higher $CO_2$ concentration.

The $CO_2$ concentration in the CCPP flue gas depends on the fuel composition, gas turbine type and load and may vary substantially depending on the operating conditions of the gas turbine. This variation in the $CO_2$ concentration can be detrimental to the performance, efficiency, and operatability of the $CO_2$ capture system.

To increase the $CO_2$ concentration in the flue gases of a CCPP two main concepts are known. One is the recirculation of flue gases as for example described by O. Bolland and S. Saether in "New Concepts for Natural Gas Fired Power Plants Which Simplify the Recovery of Carbon Dioxide" (Energy Conyers. Mgmt Vol. 33, No. 5-8, pp. 467-475, 1992). Another one is the sequential arrangement of plants, where the flue gas of a first CCPP is cooled down and used as inlet gas for a second CCPP to obtain a flue gas with increased $CO_2$ in the flue gas of the second CCPP. Such an arrangement is for example described in the US20080060346. These methods reduce the total amount of flue gas and increase the $CO_2$ concentration, and thereby reduce the required flow capacity of an absorber, the power consumption of the capture system, the capital expenditure for the capture system, and increase the $CO_2$ capture system's efficiency.

SUMMARY

The present disclosure is directed to a method for operating a combined cycle power plant including a $CO_2$ capture system and flue gas recirculation system. The method includes controlling a flue gas recirculation rate and a re-cooling temperature of the recirculated flue gases, depending on load, to optimize the overall plant efficiency including the $CO_2$ capture system.

In another aspect, the present disclosure is directed to a combined cycle power plant including a $CO_2$ capture system and flue gas recirculation system. The plant being configured to carry out a method in which a flue gas recirculation rate and a re-cooling temperature of recirculated flue gases is controlled depending on load to optimize the overall plant efficiency including the $CO_2$ capture system.

BRIEF DESCRIPTION OF THE DRAWINGS

The invention, its nature as well as its advantages, shall be described in more detail below with the aid of the accompanying drawings. Referring to the drawings.

DETAILED DESCRIPTION OF THE PREFERRED EMBODIMENTS

Introduction to the Embodiments

Figure 1:
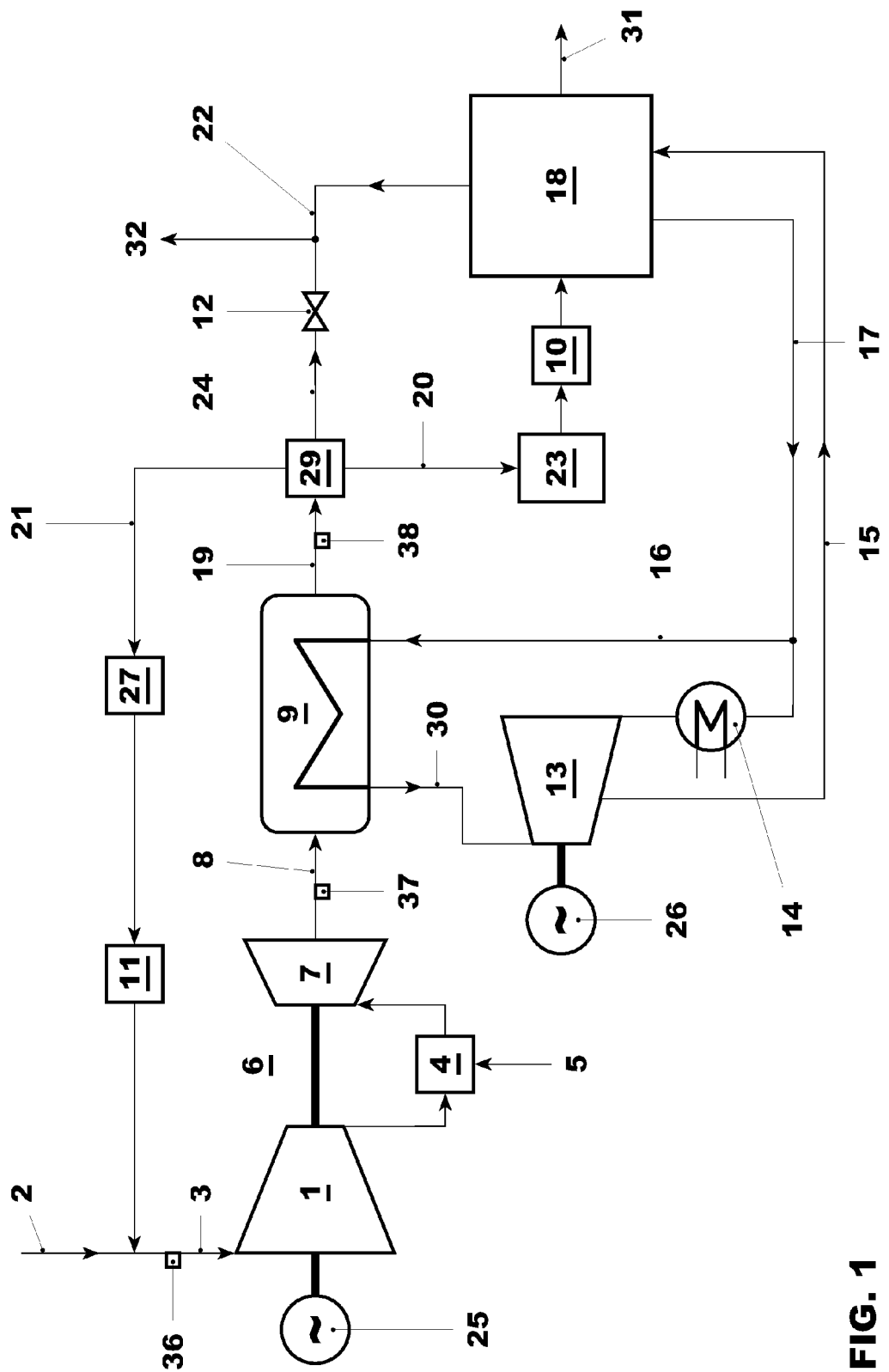
FIG. 1 schematically shows a CCPP with backend $CO_2$ absorption including flue gas recirculation, and variable speed blowers.

A main objective of the present invention is to provide a method for the optimized operation of a combined cycle power plant (CCPP) comprising at least one gas turbine, one heat recovery steam generator (HRSG), one steam turbine, a carbon dioxide ($CO_2$) capture system and with flue gas recirculation, as well as a plant designed to operate according to this method.

One objective is to reduce the impact of CCS (carbon capture and storage) on the COE (cost of electricity) for all operating conditions and to provide a flexible operation method.

To this end at least two parameters are combined to optimize the overall plant efficiency and therefore the COE. These parameters are $CO_2$ concentration in the flue gases, and the re-cooling temperature, i.e. the temperature of the recirculated flue gases, which are controlled depending on load. Additionally it is found to be advantageous to control the flue gas flow, which is sent to the capture system.

Instead of using the $CO_2$ concentration in the flue gases as a control parameter, the $CO_2$ concentration in other gas flows, which allow an estimation of the flue gas $CO_2$ concentration, is feasible. For example, use of the $CO_2$ concentration in the compressor inlet gases, can be used. Further, the residual oxygen concentration in the flue gases or the oxygen concentration in the compressor inlet gases, or gas turbine flue gases, can be used instead of the $CO_2$ concentration. Use of a combination these concentrations is also feasible.

Instead of using $CO_2$ or oxygen concentration or $CO_2$ content, the oxygen content can also be used in this context.

The optimum target values for these parameters depend on the specific plant design and are a function of the ambient conditions and the plant load. Their influence on the overall efficiency depends on the plant operating conditions.

The maximum recirculation rate is often limited by the oxygen concentration required for stable, complete combustion. Stable complete combustion in this context means, that CO and unburned hydrocarbon emissions (UHC) stay below the required level set for CO and unburned hydrocarbon emissions, which is in the order of ppm or single digit ppms, and that the combustion pulsations stay within the normal design values. Emission levels are typically prescribed by guarantee values. Design values for pulsation depend on the gas turbine, operating point, and combustor design, as well as on the pulsation frequency. They should remain well below 10% of the combustor pressure. Typically they stay below 1 or 2% of the combustor pressure.

In order to increase the operational flexibility and to allow a higher recirculation rate to further increase in the $CO_2$ concentration in the flue gases at base load and part load, an oxygen enrichment of the gas turbine inlet gases is proposed in a further embodiment. For this, oxygen or oxygen enriched air is admixed to the inlet gases of the gas turbine.

In a first approximation, the capture systems efficiency is proportional to the $CO_2$ concentration of the flue gases. Since the $CO_2$ concentration in the flue gases is proportional to the recirculation rate, an optimization target is a high recirculation rate. The recirculation rate is defined as the ratio of flue gas mass flow from the gas turbine, which is recirculated to the compressor inlet, to the total flue gas mass flow of the gas turbine.

The higher recirculation rate not only increases the $CO_2$ concentration but also leads to a reduction in the flue gas mass and volume flow passing through the $CO_2$ capture system. The lower flow also reduces the pressure drop of the system, which is advantageous to the overall performance or allows the use of smaller, less costly equipment. At base load under design conditions, the flue gas recirculation rate is maximized. It is limited by the minimum oxygen concentration required for the operation of the gas turbine. Typical recirculation rates are in the order of 30% to 50% for base load operation.

At part load operation of the gas turbine, the $CO_2$ concentration in the gas turbine flue gases is typically lower than at base load operation and the oxygen consumption for combustion decreases.

In a first approach to optimize the $CO_2$ capture efficiency, an increase of the recirculation ratio is therefore proposed for part load to keep the $CO_2$ concentration in the flue gases at a high level.

The target oxygen concentration of the inlet gases can for example be a fixed value, which is sufficient to assure stable, complete combustion in the gas turbine under all operating conditions.

When reducing the plant load starting from base load, the required oxygen concentration typically decreases, as less fuel has to be burned. However, when the flame temperature is significantly reduced, flame speed at low oxygen concentration is reduced and the excess oxygen required for complete combustion typically increases. This effect can already occur around 90% relative load of the gas turbine. For most applications it becomes significant below 70% to 80% relative load. In order to mitigate, a function of the required minimum oxygen concentration over load is proposed, which leads to the maximum recirculation rate allowable for complete combustion. This function depends on the design of the gas turbine and has to be found analytically and/or experimentally for each specific design.

Flame quenching or partial quenching, which can occur at part load, also depends on the cooling air mass flows and cooling air temperatures. For most gas turbine designs the cooling air temperatures and mass flows are a function of the compressor inlet conditions and position of variable inlet guide vanes. Therefore, the use of an additional function is proposed, which takes the influence of the inlet conditions and/or position of variable inlet guide vanes on the required minimum oxygen concentration into account.

As an alternative, a recirculation rate as function of the measured CO emissions and/or unburned hydrocarbon emissions of the flue gases is suggested. Once the CO and/or unburned hydrocarbon emissions increase above a first threshold the recirculation rate is reduced. Once they are below a second threshold value the recirculation ratio is increased. Instead of threshold values, a correction function of the recirculation rate, which depends on the CO and/or unburned hydrocarbon emissions, can also be used. In a further embodiment the threshold values or correction functions are also dependent on the relative load of the CCPP.

Flame or combustor pulsations, which typically increase if the combustion is unstable or incomplete, can also be measured and analogously be used as a control parameter for the recirculation rate. Once the pulsation level increases above a first threshold the recirculation rate is reduced. Once they fall below a second threshold value the recirculation ratio is increased. Depending on the combustor a specific pulsation frequency band, e.g. only pulsations within at least one specific frequency range are considered, can be used for the pulsation dependent recirculation control.

A combination of the above described control methods is conceivable. In particular, a load dependent recirculation rate, or a load dependent function of the inlet oxygen concentration can be combined with a correction based on measurement of combustion parameters like CO emissions, and/or unburned hydrocarbon emissions, and/or pulsations.

The flue gas recirculation rate can be increased to an optimal value in combination with admixing of oxygen or oxygen enriched at which the oxygen concentration is kept to meet the minimum required level, targeting the optimal plant thermodynamic and economic performances. Admixing of oxygen or oxygen enriched air can be applied as far as justified considering the trade off of ASU (air separation unit) and $CO_2$ capture system's performances and costs.

In one embodiment, the admixing of oxygen or oxygen enriched air to the inlet gases is done to control the oxygen concentration at the inlet. The target oxygen concentration at the compressor inlet is, for example, given as a function of load.

In a further embodiment, the admixing of oxygen or oxygen enriched air to the inlet gases is carried out as a function of carbon monoxide (CO) or unburned hydrocarbons. Once the CO and/or unburned hydrocarbon emissions increase above a first threshold the admixing of oxygen or oxygen enriched air is increased. Once they are below a second threshold value the admixing is reduced. Instead of threshold values, a correction function of the admixing, which depends on the CO and/or unburned hydrocarbon emissions, can also be used. In a further embodiment, the threshold values or correction functions are depending also on the relative load of the CCPP.

Flame or combustor pulsations, which typically increase if the combustion is incomplete, can also be measured and analogously be used as a control parameter for the admixing of oxygen or oxygen enriched air. Once the pulsation levels increase above a first threshold the admixing is increased. Once they are below a second threshold value the admixing is reduced. Depending on the combustor, a specific pulsation frequency band can be used for the pulsation dependent admixing control. Instead of threshold values a correction function of the recirculation rate, which depends on the pulsation level can also be used.

For a control method, which uses the combustor pulsations as a control parameter, at least one corresponding pulsation measurement device has to be connected to the combustor.

For a control method, which uses the CO or unburned hydrocarbons emissions as a control parameter, at least one corresponding measurement device has to be installed downstream of the gas turbine.

In a further embodiment, control of the recirculation rate is combined with a control of the admixture of oxygen or oxygen enriched air. Different possibilities to combine these control methods are conceivable.

For example, a recirculation ratio can be given as a function of load to optimize the flow in the $CO_2$ capture system, and the admixture can be used to control the stable complete combustion. In a second example the admixture of oxygen or oxygen enriched air is kept at a constant level due to the size of the ASU and the recirculation ratio is used to control the stable complete combustion.

Further, the flue gas flow becomes smaller with reduced load. An increase of the recirculation rate combined with lower flue gas mass flow of the gas turbine can lead to a significant drop in the flue gas mass flow, which is sent to the $CO_2$ capture unit. However, depending on the design, an optimum mass flow or flow velocity should be maintained in the $CO_2$ capture system. This optimum flow can limit the recirculation rate. Depending on the design of the $CO_2$ capture system, a reduction in the recirculation rate can therefore be required at low loads to maintain the optimum flow through the $CO_2$ capture system. Depending on the $CO_2$ capture unit the capture unit's efficiency might be almost independent of the flow without a pronounced maximum efficiency over flow rate. However, they are typically still limited by a minimum flow below which flow instabilities can occur that can lead to vibrations in the $CO_2$ capture system. In this case the control is simplified to assure the minimum flow.

During base load operation, the plant power typically drops with increasing gas turbine inlet temperature. The target re-cooling temperature is therefore typically as low as possible. It is normally limited by the capacity of the re-cooler. Only if a large low temperature heat sink is available, e.g. low ambient temperature and/or low temperature cooling water, or if icing danger or other operating parameters of the plant might restrict the operation, the re-cooling temperature might be controlled to a higher target temperature.

At part load, when the total mass flows are reduced, the total recirculation mass flow typically also decreases, and the re-cooler typically has the capacity to cool to a lower temperature than at base load. However, for most plant designs increasing the compressor inlet temperature of the gas turbine can increase the part load efficiency at a certain load set point.

Typically the efficiency of a CCPP is proportional to load. When operating at a higher inlet temperature the relative load increases. The efficiency benefit due the increase is higher than the efficiency penalty, which might be caused by an increase of the inlet temperature.

The exit temperature of the re-cooler and therefore the re-cooling temperature can be increased at part load to realize the higher gas turbine compressor inlet temperature as long as the compressor inlet temperature stays within the operating limits of the gas turbine. Therefore a load dependent recirculation rate combined with a load dependent re-cooling temperature is proposed.

The flue gas temperature to the $CO_2$ capture plant after cooling shall also be optimized for the $CO_2$ capture system, taking into account the cooler limitations.

The $CO_2$ capture system itself can include more than one capture train. To optimize the part load operation it can be advantageous to shut down at least one capture train. As a result the optimum recirculation ratio can become a function of the active capture trains. The integration of the capture system operation with the CCPP operation is advantageous for the overall plant efficiency.

In a first control step the number of active capture trains is adjusted to the plant load. In a second step the recirculation rate is adjusted to optimize the plant efficiency at the specific load and with the specific number of active capture trains. For this, two alternative optimization strategies are proposed. Either the recirculation rate is used to control the $CO_2$ concentration in the flue gases at the optimum level for the active trains of the capture system or it is used to keep the flow velocity in the capture trains at the optimum speed.

In addition to the method, a plant for operating according to the method is part of the invention. A plant designed for optimized operation comprises at least one gas turbine, a $CO_2$ capture system, a flue gas recirculation system with a flue gas duct, which directs a first partial flow of the flow gases to the inlet gas flow, at least one control organ to control the recirculation ratio, a re-cooler with temperature control to cool the recirculation flue gases, and at least one $CO_2$ and/or oxygen concentration measurement device.

A recirculation system comprises a flue gas recirculation line or duct, a control organ to control the recirculation rate, and a recirculation flue gas cooler. For recirculation the flue gas flow is divided into at least two partial flows downstream of the HRSG. A first partial flow is returned to the inlet of the gas turbine via a flue gas recirculation line, and a second partial flow is directed via the $CO_2$ capture system to the stack for release to the environment. Further, a bypass can be provided to increase the operational flexibility. This allows the choice of any combination of recirculation rate, of flue gas flow to $CO_2$ capture unit, and direct flue gas flow to the stack.

To control the recirculation rate the exhaust flow and/or recirculation flow can be controlled by at least one control organ. This can for example be a controllable damper or a fixed splitter combined with a control organ in one or both of the flue gas lines downstream of the splitter.

As mentioned above, the first partial flow, which is recirculated, typically has to be further cooled by a re-cooler before mixing with ambient air for reintroduction into the compressor of the gas turbine. In one embodiment, the control organ, for example a flap or valve, to control the recirculation ratio is installed downstream of this re-cooler to reduce thermal load on this control body.

In a further embodiment a blower is installed in the recirculation lines and/or the exhaust gas lines, which lead to the $CO_2$ capture system. The blower can be advantageous to reduce equipment size as the allowable pressure drop is increased. Practical equipment sizes can only be realized with a reasonable pressure drop over the capture system and recirculation lines. Limitations from the gas turbine and HRSG design can be overcome.

The blowers are typically located downstream of the coolers, which reduces their power consumption and the thermal load they have to withstand. Further, they operate under stable flue gas temperature and smaller volume flows compared to a design in which the blowers are located upstream of the coolers.

Further, to minimize the power consumption of the blower, a variable speed control is proposed. Thus, the blower can be used to control the recirculation rate. Variable dampers, flaps or control valves, which inherently cause a pressure drop, can be avoided. Therefore, the total system pressure drops can be reduced by the use of variable speed blowers. Alternatively, a blower with controllable blade or guide vane angles is also conceivable. Depending on the design and pressures in the flue gas and recirculation system boosters can be used instead of blowers.

Another aspect of the use of blower is the possibility to improve the purge operation of the plant.

To ensure a safe operation of a CCPP, all the ducts, lines, HRSGs and other enclosed volumes, which can be reached by flue gases, need to be purged by air before fuel can be admitted and ignition can be allowed in a gas turbine.

In a conventional CCPP this is typically done by a purge operation of the gas turbine. For this purge operation the gas turbine is accelerated to a purge speed and operated at this speed for a specified plant specific period of time. The required purge time is a function of the HRSG and flue gas duct volumes and the volume flow of the gas turbine at purge speed. Purge requirements vary depending on country and applicable regulations. Typically, a minimum five-minute purge operation is required, and 3 to 5 times the HRSG volume has to be purged. For this operation the gas turbine is typically driven by its generator, which is operated as a motor with the help of static frequency converter.

Due to the large volumes of the $CO_2$ capture system, the flue gas recirculation lines, and due to the split of the flue gas lines a purge operation using only the gas turbine might require excessively long purge times. Further, depending on the plant design, and volume flows during purge operation, sufficient purging of all critical equipment might not be assured with a conventional purge operation. Here, blowers in the flue gas lines can be used to enhance the purging of the lines, and the equipment connected to them. The blowers can be used individually or in combination with the gas turbine to ensure sufficient purging of the plant.

In the above discussion relative load of the gas turbine or CCPP, i.e. the power output of the gas turbine, respectively the CCPP divided by the base load power output under the respective ambient conditions is used. Since the CCPP load is a function of the GT load the CCPP relative load can be used instead of gas turbine relative load, and vice versa. The use of absolute power instead of relative power is also conceivable.

DETAILED DESCRIPTION

A power plant for execution of the proposed method comprises a conventional CCPP, equipment for flue gas recirculation, and a $CO_2$ capture system 18.

A typical arrangement with post combustion capture, and flue gas recirculation is shown in FIG. 1. A turbine 6, which drives a first generator 25, is supplied with compressor inlet gas 3, and fuel 5. The compressor inlet gas 3 is a mixture of ambient air 2, and flue gas, which is recirculated via a flue gas recirculation line. The inlet gas is compressed in a compressor 1. The compressed gas is used for combustion of the fuel 5 in a combustor 4, and the pressurized hot gases expand in a turbine 7. Its main outputs are electric power, and hot flue gases 8.

The gas turbine's hot flue gases 8 pass through a HRSG 9, which generates live steam 30 for a steam turbine 13. The steam turbine 13 either is arranged in a single shaft configuration with the gas turbine 6 and a first generator 25, or is arranged in a multi shaft configuration to drive a second generator 26. Further, steam is extracted from the steam turbine 13 and supplied via a steam line 15 to the $CO_2$ capture system 18. The steam is returned to the steam cycle at reduced temperature or as a condensate via the return line 17 and is reintroduced into the steam cycle. The steam cycle is simplified and shown schematically without different steam pressure levels, feed water pumps, etc., as these are not subject of the invention.

A first partial flow 21 of the flue gases from the HRSG 19 is recirculated to the inlet of the compressor 1 of the gas turbine 6 where it is mixed with ambient air 2. The first partial flow 21 is cooled in the recirculation flue gas cooler 27 before mixing with ambient air 2.

A second partial flow 20 of the flue gases from the HRSG 19 is directed to the $CO_2$ capture system 18 by the damper 29. This second partial flow 20 is cooled by the flue gas cooler 23 before flowing to the $CO_2$ capture system 18. To enhance the flue gas flow and to control the recirculation rate a variable speed flue gas blower to $CO_2$ capture system 10 is installed between flue gas cooler 23 and the $CO_2$ capture system 18, and a variable speed flue gas blower for recirculation 11 is installed downstream of the recirculation flue gas cooler 27 before mixing the recirculated first partial flow 21 of the flue gases with ambient air 2.

The $CO_2$ depleted flue gas 22 is released from the $CO_2$ capture system 18 to the environment via a stack 32. In case the $CO_2$ capture system 18 is not operating, it can be bypassed via the flue gas bypass 24.

During normal operation the captured $CO_2$ 31 will be compressed in a $CO_2$ compressor and the compressed $CO_2$ will be forwarded for storage or further treatment.

Measurement devices to measure the oxygen and/or $CO_2$ concentration are proposed in order to better control the oxygen concentration of the different gas streams. For example, an inlet air $CO_2$ and/or $O_2$ measurement device 36 can be applied for better control of the inlet gas composition for the gas turbine 6. For the control of the gas turbine's flue gas composition, a gas turbine flue gas $CO_2$ and/or $O_2$ measurement device 37 can for example be applied. Due to the lower flue gas temperatures downstream of the HRSG 9, it can be advantageous measure the flue gas composition downstream of the HRSG 9 by a HRSG flue gas $CO_2$ and/or $O_2$ measurement device 38.

Other than conventional gas chromatography, there are several different methods, systems, and measurement devices to measure the oxygen concentration and $CO_2$ concentration of the different gas streams. $CO_2$ can for example easily be measured using Nondispersive Infrared (NDIR) $CO_2$ sensors, or Chemical $CO_2$ sensors. Oxygen concentration can, among others, be measured using zirconia, electrochemical or Galvanic, infrared, ultrasonic sensors, and laser technology. Fast online sensors can be applied for optimized operation.

Figure 2:
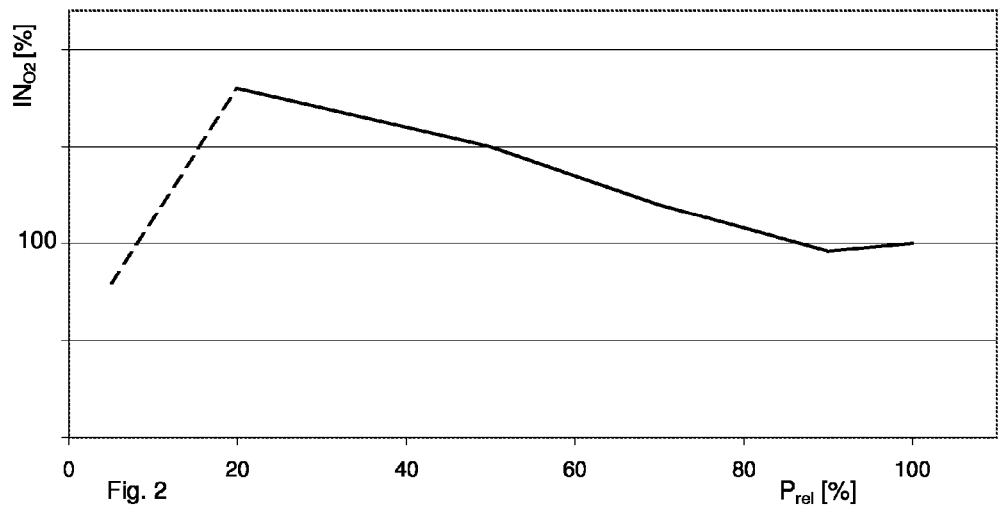
FIG. 2 schematically shows an example of the normalized oxygen concentration of the GT inlet gas as a function of the relative load.

FIG. 2 schematically shows an example for the normalized oxygen concentration at the GT inlet gas as a function of the relative load, which is required for stable complete combustion. It is normalized with the oxygen concentration required at base load operation.

At low load, when the combustor is working with a diffusion flame, the required excess oxygen is low and the corresponding normalized oxygen concentration of the inlet air $IN_{O2}$ is low in spite of a low flame temperature. Once the combustor operates with a premix flame, the required excess oxygen and the corresponding normalized oxygen concentration of the inlet air $IN_{O2}$ increases to a maximum. With increasing load the flame temperature increases, which facilitates complete combustion and allows a reduction in the normalized oxygen concentration of the inlet air $IN_{O2}$. At high load, typically above 80 to 90% relative load $P_{rel}$, the flame temperature is typically high enough to assure complete combustion and a minimum in the normalized oxygen concentration of the inlet air $IN_{O2}$ is reached. With a further increase in load, the compressor inlet mass typically still increases. However, the specific fuel consumption relative to the inlet mass flow also increases and therefore the normalized oxygen concentration of the inlet air $IN_{O2}$ is increasing again up to base load.

Depending on the combustor no stable pilot combustion with low oxygen concentration might be possible at low load. A much higher oxygen concentration would then be required than the one shown in FIG. 2. Therefore the line from around 5% load to about 20% load is only given as a dotted line.

Figure 3:
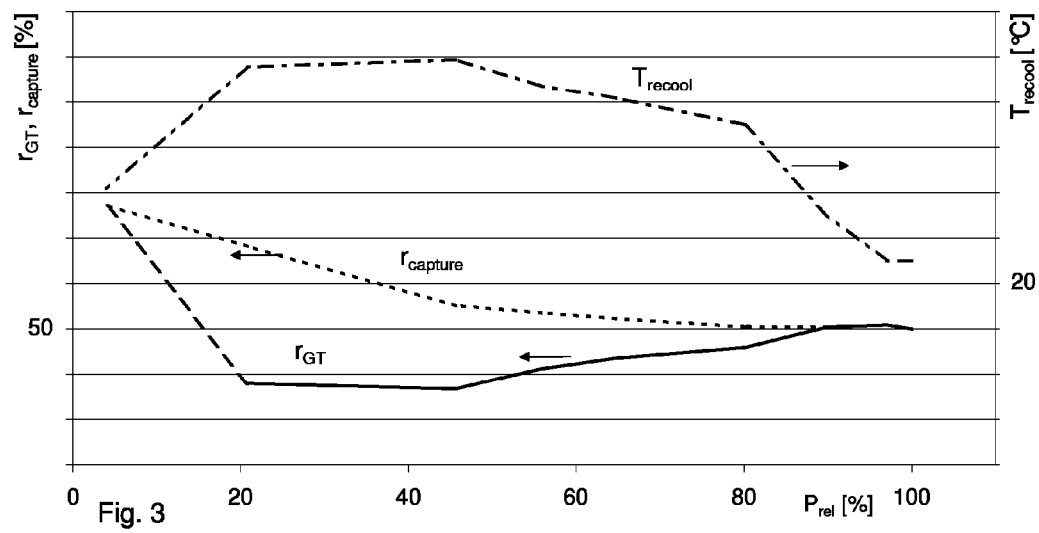
FIG. 3 schematically shows an example of the recirculation ratio optimized for best $CO_2$ capture efficiency, the optimized recirculation ratio for complete combustion, and the re-cooling temperature of the recirculated flue gases after re-cooler as a function of the relative load.

FIG. 3 schematically shows an example for the optimization of the recirculation ratio, and re-cooling temperature taking into account the required normalized oxygen concentration of the inlet air $IN_{O2}$ of the gas turbine 6.

The recirculation rate for best $CO_2$ capture efficiency $r_{capture}$, indicated by the dotted line, is an example for the change of recirculation rate required to keep a constant high $CO_2$ concentration in the flue gas. Starting from base load, the recirculation rate for best $CO_2$ capture efficiency $r_{capture}$, increases only with a slight gradient down to about 50% load. In the load range between about 50% and 100% the load is typically controlled by a combination of turbine inlet temperature and variable inlet guide vanes control. As a result the inlet mass flow specific fuel injection stays close to constant and the specific $CO_2$ generation remains almost constant. Below about 50% load, the variable inlet guide vanes are at their closed position, the inlet mass flow remains practically constant, and the gas turbine load is only controlled by the turbine inlet temperature. Once the inlet mass flow is close to constant, the specific $CO_2$ production decreases with a reduction in the turbine inlet temperature. The required recirculation rate to maintain a constant $CO_2$ concentration in the flue gases increases correspondingly.

However, taking into account the required normalized oxygen concentration of the inlet air $IN_{O2}$ from the gas turbine 6, the gas turbine recirculation ratio $r_{GT}$ has to be applied for the gas turbine operation. At base load the system is optimized for complete combustion and high recirculation rate for the $CO_2$ capture system and in this example the gas turbine recirculation ratio $r_{GT}$ equals the recirculation rate for best $CO_2$ capture efficiency $r_{capture}$ at base load. As discussed with the help of FIG. 2, an increase in the normalized oxygen concentration of the inlet air $IN_{O2}$ of the gas turbine is required when reducing the load. Correspondingly, the gas turbine recirculation ratio $r_{GT}$, which can be realized with the gas turbine, has to be reduced. Only at very low load, when the gas turbine is operating with a diffusion flame, the gas turbine recirculation ratio $r_{GT}$ can typically be raised back to meet the level needed for optimum $CO_2$ concentration.

Depending on the combustor, no stable combustion with low oxygen concentration might be possible at low load. In this case only much smaller recirculation rates can be realized at about 5% load. Therefore the line from around 5% load to about 20% load is only given as a dotted line.

By controlling the recirculation mass flow, controlling the temperature after recirculation flue gas re-cooler (27), and taking into account the temperature of the ambient air, and the inlet mass flow of the compressor 1, the inlet temperature of the compressor 1 can be controlled.

At base load the re-cooling temperature is typically limited by the capacity of the recirculation flue gas re-cooler (27), and depends on the available heat sink. In case of a cooling water cooler with cooling water from a river or the sea, the water temperature dictates the possible re-cooling temperature. In case of an air cooler, the minimum re-cooling temperature is typically 5 to 10° C. above ambient temperature. Depending on the recirculation rate the temperature rise in the compressor inlet temperature is smaller.

If a specific part load power output is required from the CCPP, the turbine inlet temperature or hot gas temperature is reduced, and the variable inlet guide vanes are closed according to the operating concept until the target power is met. Both lead to a reduction in the plant efficiency, which is proportional to the relative load reduction. By controlling the compressor inlet temperature, the base load power of the plant can be controlled. In particular an increase in the compressor inlet temperature leads to a reduction in the base load power. As a result, the specific power output mentioned above might be reached at base load or at an increased relative power. As long as the efficiency gain due to operation at increased relative load is bigger than the efficiency penalty due to operation at an increased inlet temperature, increasing the compressor inlet temperature can increase the overall efficiency. A plant specific optimum compressor inlet temperature can be determined for every load set point. Based on the optimum compressor inlet temperature, temperature of the ambient air 2, and the load specific gas turbine recirculation ratio $r_{GT}$ an optimum re-cooling temperature $T_{recool}$ can be determined. At base load, this is limited by the cooling capacity of the re-cooler. At lower loads, the re-cooling temperature $T_{recool}$ can be raised until the mixture of ambient air and re-cooled flue gases reach the allowable maximum compressor inlet temperature. In this example the maximum allowable compressor inlet temperature is a fixed value. However, since the gas turbine recirculation ratio changes over load, the re-cooling temperature $T_{recool}$ required to obtain the constant mixing temperature also changes over load.

Depending on the design of the gas turbine 6, the allowable maximum compressor inlet temperature is not constant. This might for example be the case if the compressor end temperature or a cooling air bleed temperature from the mid compressor is the limiting factor. As result a different limiting function for the re-cooling temperature $T_{recool}$ would be obtained.

In a more refined embodiment the influence of ambient pressure, humidity and inlet/outlet pressure drop can for example also be taken into account to determine the load specific optimum compressor inlet temperature and the corresponding optimum re-cooling temperature.

Figure 4:
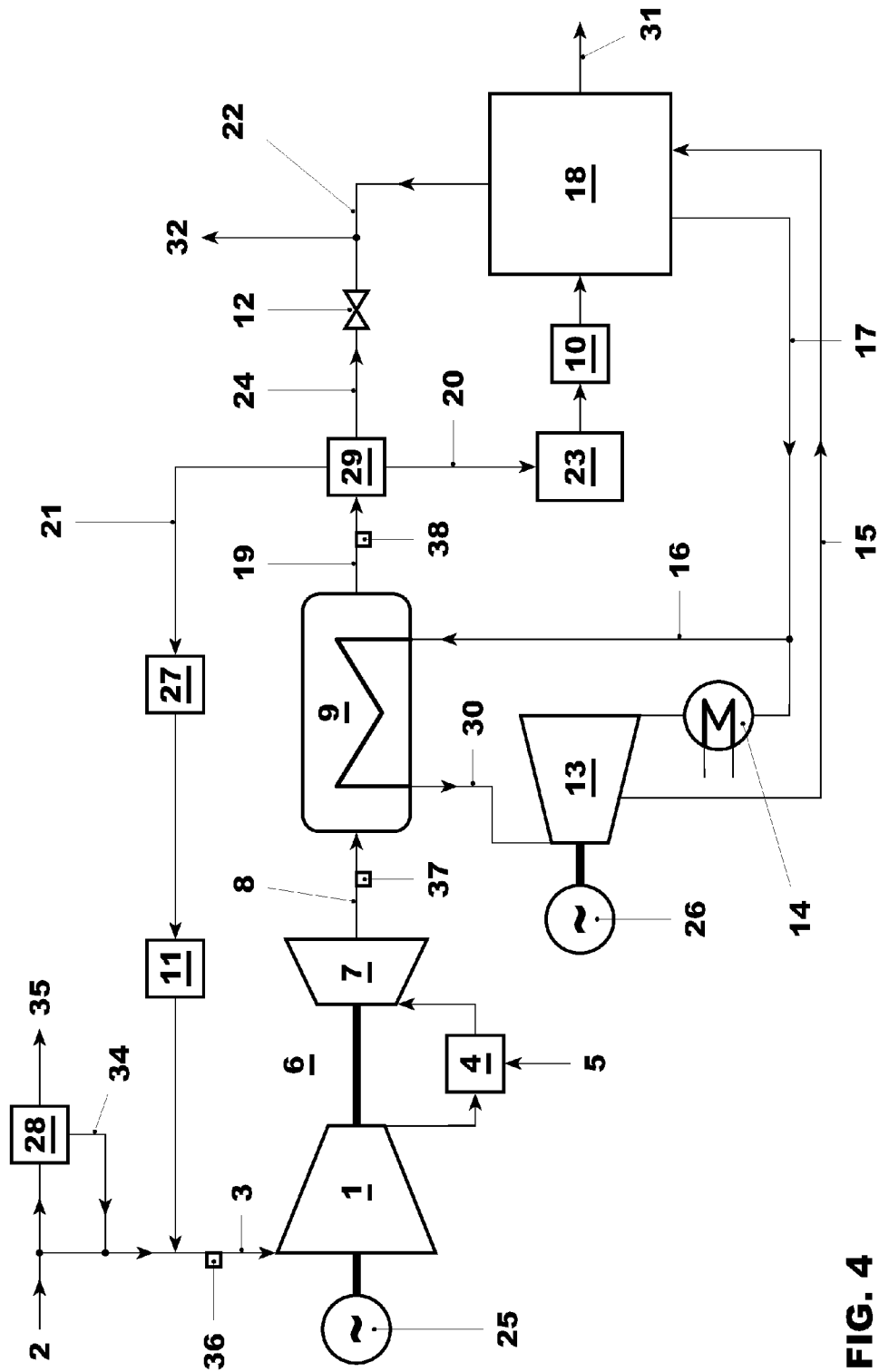
FIG. 4 schematically shows a CCPP with backend $CO_2$ absorption including flue gas recirculation, oxygen enrichment, and variable speed blowers.

To further enhance the operational flexibility and to overcome the restrictions in recirculation rate at part load and base load, an oxygen enrichment of the gas turbine inlet gases is proposed. FIG. 4 schematically shows an arrangement for oxygen enrichment in a CCPP with backend $CO_2$ absorption including flue gas recirculation, and variable speed blowers.

The arrangement and functions are based on the ones shown in FIG. 1. In addition an ASU (air separation unit) 28 is arranged upstream of the compressor 1. The air separation unit 28 separates oxygen or oxygen enriched air 34 from part of the inlet air 2. The oxygen or oxygen-enriched air 34 is mixed with ambient air 2 and recirculated flue gases from the flue gas recirculation line. Oxygen depleted air 35 is dumped to the atmosphere. In this application a conventional ASU with cryogenic separation can be applied. However, membrane based separation techniques, which require less energy can be applied. They can especially be favorable because only oxygen enriched air but no pure oxygen is required for the proposed process. Control bodies to control the ratio of ambient air to oxygen enrichment like valves, dampers or blowers are foreseen (not shown).

Exemplary embodiments described above and in the drawings disclose to a person skilled in the art embodiments, which differ from the exemplary embodiments and which are contained in the scope of the invention.

For example, it might be advantageous to only use oxygen-enriched air 34 without mixing it with ambient air 2 after the air separation unit 28, and to directly mix this oxygen enriched air 34 with the recirculated flue gases, the first partial flow 21, to obtain the compressor inlet gas 3. This might reduce the power requirements to increase the mixture's total oxygen concentration as the power requirement of membrane separation techniques is typically proportional to the increase in concentration and the maximum oxygen concentration is reduced if no mixing with ambient air takes place.

Further, a liquid fuel might be burned, for example, in the gas turbine instead of the fuel gas 5.

To realize a control method, which uses the CO or unburned hydrocarbons emissions as a control parameter, at a CO or unburned hydrocarbons emissions measurement device has to be installed downstream of the gas turbine 6.

It can for example be installed at the location of the gas turbine flue gas $CO_2$ and/or $O_2$ measurement devices 37 or at the location of the HRSG flue gas $CO_2$ and/or $O_2$ measurement devices corresponding measurement device 38. It might also be a combined measurement device.

LIST OF REFERENCE SYMBOLS

1 Compressor
2 Ambient air
3 Compressor inlet gas
4 Combustor
5 Fuel gas for GT
6 Gas Turbine GT
7 Turbine
8 Hot flue gas from gas turbine
9 HRSG (heat recovery steam generator)
10 Flue gas blower for second partial flow (to $CO_2$ capture system)
11 Flue gas blower for first partial flow (flue gas recirculation)
12 Bypass flap or valve
13 Steam turbine
14 Condenser
15 Steam extraction for $CO_2$ capture
16 Feed water
17 Condensate return line
18 $CO_2$ capture system
19 Flue gas from HRSG
20 Second partial flow (Flue gas line to $CO_2$ capture system)
21 First partial flow (Flue gas recirculation)
22 $CO_2$ depleted flue gas
23 Flue gas cooler (for second partial flow)
24 Flue gas bypass to stack
25 First generator
26 Second generator
27 Recirculation flue gas re-cooler (for first partial flow)
28 ASU (air separation unit)
29 Flue gas splitter
30 Live steam
31 Captured $CO_2$
32 Stack
34 Oxygen/oxygen enriched fuel
35 Oxygen depleted air
36 Inlet air $CO_2$ and/or $O_2$ measurement devices
37 Gas turbine flue gas $CO_2$ and/or $O_2$ measurement devices
38 HRSG flue gas $CO_2$ and/or $O_2$ measurement devices
CCPP Combined cycle power plant
COE Cost of electricity
$IN_{O2}$ Normalized oxygen concentration in the inlet air
$P_{rel}$ Relative load of the CCPP
$r_{GT}$ Gas turbine recirculation rate
$r_{capture}$ Recirculation rate for best $CO_2$ capture efficiency
$T_{recool}$ Re-cooling temperature

What is claimed is:

1. A method for operating a combined cycle power plant comprising at least one gas turbine and a heat recovery steam generator with a $CO_2$ capture system and flue gas recirculation system comprising a flue gas duct, which directs a first partial flow of flue gases from the heat recovery steam generator to an inlet gas flow of the at least one gas turbine, at least one control body to control a recirculation ratio, a re-cooler with temperature control to cool recirculation flue gases, at least one CO2 and/or oxygen concentration measurement device, wherein the first partial flow, which is recirculated, is cooled by a recirculation flue gas re-cooler before mixing with ambient air for reintroduction into a compressor of the gas turbine, and a second partial flow is directed via the CO2 capture system to a stack for release to the environment, the method comprising:
controlling a flue gas recirculation rate and a re-cooling temperature of the recirculated flue gases, depending on load, to optimize the overall plant efficiency including the $CO_2$ capture system wherein flue gas recirculation rate at base load equals a recirculation rate for best CO2 capture efficiency of the CO2 capture system and is reduced below a recirculation rate for best CO2 capture efficiency of the CO2 capture system at a load below base load, and wherein at part load the re-cooling temperature is increased over a base load re-cooling temperature.

2. The method according to claim 1, wherein oxygen or oxygen enriched air is admixed to the inlet gases of the gas turbine compressor of the combined cycle power plant to allow a higher flue gas recirculation rate.

3. The method according to claim 2, wherein a minimum normalized oxygen concentration in inlet air is given as a function of relative load of the combined cycle power plant and the normalized oxygen concentration in the inlet air is controlled by variation of the recirculation rate and/or admixing of oxygen or oxygen enriched air.

4. The method according to claim 2, wherein the recirculation rate is a highest possible recirculation rate given that the normalized oxygen concentration in the inlet air remains sufficient to assure complete combustion with low CO and unburned hydrocarbon emissions.

5. The method according to claim 2, wherein the recirculation rate and/or admixing of oxygen or oxygen enriched air is adjusted as a function of measured CO and/or unburned hydrocarbon emissions.

6. The method according to claim 2, wherein the recirculation rate and/or admixing of oxygen or oxygen enriched air is adjusted as a function of measured combustor pulsations.

7. The method according to claim 1, wherein the recirculation rate is kept above a minimum value to assure a required minimum flow through the $CO_2$ capture system.

8. The method according to claim 1, wherein the re-cooling temperature is controlled as a function of relative load.

9. The method according to claim 1, wherein the re-cooling temperature is controlled as a function of relative load and the recirculation rate.

10. The method according to claim 1, wherein a target compressor inlet temperature of the gas turbine is a function of relative load and is controlled by a combination of controlling the re-cooling temperature and the recirculation rate.

11. The method according to claim 1, wherein the recirculation rate is controlled with the help of a variable speed flue gas blower for recirculation and/or with the help of a variable speed flue gas blower to $CO_2$ capture system for the flue gases directed to the $CO_2$ capture system.

12. The method according to claim 1, wherein a flue gas blower for recirculation and/or flue gas blower to $CO_2$ capture system is used to enhance a purge operation.

13. The method according to claim 1, wherein the re-cooling temperature can be increased at part load relative to the base load re-cooling temperature to realize a higher gas turbine compressor inlet temperature at part load.

14. The method according to claim 1, wherein the recirculation rate has a first maximum above 80% relative load, has a lower value than said first maximum at 50% relative load and a second maximum value below 50% relative load.

15. The method according to claim 1, wherein at part load operation, the recirculation rate is below the recirculation rate for best CO2 capture efficiency of the CO2 capture system.

16. A combined cycle power plant comprising at least one gas turbine, a heat recovery steam generator with a $CO_2$ capture system and flue gas recirculation system having a flue gas duct, which directs a first partial flow of the flue gases from the heat recovery steam generator to an inlet gas flow of a gas turbine, at least one control body to control the recirculation ratio, a re-cooler with temperature control to cool recirculation flue gases, at least one CO2 and/or oxygen concentration measurement device, the combined cycle power plant configured to control a flue gas recirculation rate and a re-cooling temperature of the recirculated flue gases depending on load to optimize overall plant efficiency including the CO2 capture system, wherein a flue gas recirculation rate at base load equals a recirculation rate for best CO2 capture efficiency of the CO2 capture system and is reduced below a recirculation rate for best CO2 capture efficiency of the CO2 capture system at a load below base load, and wherein at part load the re-cooling temperature is increased over a base load re-cooling temperature.

17. The power plant according to claim 16, further comprising CO and/or unburned hydrocarbon measurement device downstream of the gas turbine.

18. The power plant according to claim 16, further comprising a variable speed flue gas blower for recirculation and/or a variable speed flue gas blower to $CO_2$ capture system for the flue gases directed to the $CO_2$ capture system for control of the recirculation rate.

19. The power plant according to claim 16, further comprising an air separation unit for admixing oxygen or oxygen enriched air (34) to inlet gases of the compressor.

* * * * *